(12) United States Patent
Dejong et al.

(10) Patent No.: US 11,164,147 B2
(45) Date of Patent: Nov. 2, 2021

(54) COMPUTER STORAGE SYSTEM FOR GENERATING WAREHOUSE MANAGEMENT ORDERS

(71) Applicant: Target Brands, Inc., Minneapolis, MN (US)

(72) Inventors: Jonathan Dejong, Minneapolis, MN (US); Shaun Jurgemeyer, Minneapolis, MN (US); Kyle Boon, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 99 days.

(21) Appl. No.: 16/726,490

(22) Filed: Dec. 24, 2019

(65) Prior Publication Data

US 2020/0210945 A1 Jul. 2, 2020

Related U.S. Application Data

(60) Provisional application No. 62/785,630, filed on Dec. 27, 2018.

(51) Int. Cl.
*G06Q 10/08* (2012.01)
*G06Q 10/06* (2012.01)

(52) U.S. Cl.
CPC ..... *G06Q 10/087* (2013.01); *G06Q 10/06311* (2013.01); *G06Q 10/08355* (2013.01)

(58) Field of Classification Search
CPC ........... G06Q 10/087; G06Q 10/06311; G06Q 10/06; G06Q 10/06316; G06Q 20/203; G06Q 50/28; G06Q 10/083; G06Q 10/08
See application file for complete search history.

(56) References Cited

U.S. PATENT DOCUMENTS

| | | | | | |
|---|---|---|---|---|---|
| 5,363,310 | A | * | 11/1994 | Haj-Ali-Ahmadi | .... B65G 1/137 414/273 |
| 5,430,831 | A | * | 7/1995 | Snellen | ................ G06Q 10/043 700/217 |
| 6,801,901 | B1 | * | 10/2004 | Ng | ....................... G06Q 10/087 705/28 |

(Continued)

OTHER PUBLICATIONS

Oracle Warehouse Management User's Guide—Release 12 Oracle, Apr. 2007 (Year: 2007).*

(Continued)

*Primary Examiner* — Scott L Jarrett
(74) *Attorney, Agent, or Firm* — Fish & Richardson P.C.

(57) ABSTRACT

For an enterprise system in which physical items are stored in physical container and in which physical container are stored in other physical containers, a data system has data records identifying logical items and logical containers that correspond to the physical items and physical containers, the data records further reflecting the storage of physical items and physical containers with other physical containers. Some of the items are identified as as high-priority items. Containers to hold the high-priority items in transit are identified. Excess capacity in the containers is identified. Low-priority items to be sent are identified. The high-priority items and the low-priority items are aggregated into a list of items-to-be-moved. A list of tasks includes instructions to move the items-to-be-moved from their respective starting logical locations to the containers is made and distributed.

20 Claims, 13 Drawing Sheets

(56) References Cited

U.S. PATENT DOCUMENTS

| | | | | |
|---|---|---|---|---|
| 6,937,992 | B1* | 8/2005 | Benda | G06Q 10/04 705/7.26 |
| 7,031,801 | B1* | 4/2006 | Hodge | B65G 1/137 700/213 |
| 7,136,830 | B1* | 11/2006 | Kuelbs | G06Q 30/06 705/26.2 |
| 7,139,637 | B1 | 11/2006 | Waddington et al. | |
| 7,426,484 | B2* | 9/2008 | Joyce | G06Q 10/08 235/385 |
| 7,711,602 | B2* | 5/2010 | Kroswek | G06Q 10/08 705/22 |
| 7,979,359 | B1* | 7/2011 | Young | G06Q 10/06 705/332 |
| 8,311,902 | B2* | 11/2012 | Mountz | G06Q 10/0833 705/28 |
| 8,515,835 | B2* | 8/2013 | Wu | G06Q 10/087 705/28 |
| 8,799,293 | B2* | 8/2014 | Breitling | G06Q 10/087 707/748 |
| 8,904,144 | B1* | 12/2014 | Chelur | G06F 3/0605 711/172 |
| 9,280,756 | B2* | 3/2016 | Hara | G06Q 10/087 |
| 9,460,524 | B1* | 10/2016 | Curlander | G01F 22/00 |
| 10,290,046 | B2* | 5/2019 | Wadhawan | G06Q 30/0633 |
| 10,618,735 | B1* | 4/2020 | Oh | B65G 1/137 |
| 10,824,982 | B1* | 11/2020 | Whitehouse | G06Q 10/0832 |
| 2002/0019759 | A1* | 2/2002 | Arunapuram | G06Q 10/04 705/7.26 |
| 2002/0122715 | A1* | 9/2002 | Pape | G06Q 10/087 414/799 |
| 2002/0178074 | A1* | 11/2002 | Bloom | G06Q 10/08 705/26.81 |
| 2003/0110102 | A1* | 6/2003 | Chien | G06Q 10/087 705/28 |
| 2003/0200111 | A1* | 10/2003 | Damji | G06Q 10/08 705/335 |
| 2005/0149373 | A1* | 7/2005 | Amling | G06Q 10/0831 705/28 |
| 2005/0261954 | A1 | 11/2005 | Aoyama et al. | |
| 2006/0020366 | A1* | 1/2006 | Bloom | B07C 3/02 700/226 |
| 2006/0224426 | A1* | 10/2006 | Goossens | G06Q 50/188 705/80 |
| 2006/0287926 | A1* | 12/2006 | Mitchell | G06Q 30/0635 705/337 |
| 2007/0038323 | A1* | 2/2007 | Slocum | G06Q 10/087 700/99 |
| 2007/0290040 | A1* | 12/2007 | Wurman | G06Q 10/087 235/385 |
| 2008/0167933 | A1* | 7/2008 | Hoffman | G06Q 10/087 705/28 |
| 2009/0138384 | A1* | 5/2009 | McCormick | G06Q 10/0637 705/28 |
| 2013/0218799 | A1* | 8/2013 | Lehmann | G06Q 10/083 705/337 |
| 2014/0279294 | A1 | 9/2014 | Field-Darragh et al. | |
| 2015/0046229 | A1* | 2/2015 | Gollu | G06Q 10/083 705/7.39 |
| 2017/0024804 | A1 | 1/2017 | Tepfenhart et al. | |
| 2017/0109696 | A1* | 4/2017 | Serjeantson | G06Q 30/0217 |
| 2017/0372263 | A1* | 12/2017 | Kim | G06Q 50/28 |
| 2018/0018622 | A1* | 1/2018 | Notohardjono | G06F 16/2358 |
| 2018/0060765 | A1* | 3/2018 | Hance | G05B 15/02 |
| 2018/0082162 | A1* | 3/2018 | Durham | G06Q 50/28 |
| 2018/0082244 | A1* | 3/2018 | Brazeau | G06T 7/73 |
| 2018/0211201 | A1* | 7/2018 | Nayak | G06Q 10/083 |
| 2018/0300798 | A1* | 10/2018 | Rajkhowa | G06Q 10/083 |
| 2019/0193956 | A1* | 6/2019 | Morland | B65G 61/00 |
| 2019/0325377 | A1* | 10/2019 | Rajkhowa | G06Q 10/087 |
| 2020/0019918 | A1* | 1/2020 | Li | G06Q 10/087 |
| 2020/0065758 | A1* | 2/2020 | Kumar | G06Q 10/0832 |
| 2021/0047120 | A1* | 2/2021 | Gong | G06Q 10/08 |
| 2021/0122506 | A1* | 4/2021 | Kiessner | B65D 21/0209 |
| 2021/0158285 | A1* | 5/2021 | Ager | G06Q 10/08345 |

OTHER PUBLICATIONS

Oracle Shipping Execution User's Guide—Release 11 Oracle, Apr. 2000 (Year: 2000).*

Inboundlogistics.com [online], "New Retail Strategies: It's a Store! It's a Site! It's a Warehouse!," Aug. 8, 2014, [retrived on Dec. 17, 2019], retrieved from: URL <https://www.inboundlogistics.com/cms/article/new-retail-strategies-its-a-store-its-a-site-its-a-warehouse/>, 6 pages.

NYTimes.com [online], "Nordstrom Links Online Inventory to Real World," Aug. 23, 2010, [retrived on Mar. 8, 2018], retrieved from: URL <http://www.nytimes.com/2010/08/24/business/24shop.html>, 5 pages.

WSJ.com [online], "Retailers Rethink Inventory Strategies," Jun. 27, 2016, [retrived on Mar. 8, 2018], retrieved from: URL <https://www.wsj.com/articles/retailers-rethink-inventory-strategies-1467062280>, 4 pages.

* cited by examiner

COMPUTER STORAGE SYSTEM FOR GENERATING WAREHOUSE MANAGEMENT ORDERS

CROSS REFERENCE TO RELATED APPLICATIONS

This application claims the benefit of U.S. Provisional Application Ser. No. 62/785,630, filed Dec. 27, 2018. The disclosure of the prior application is considered part of (and is incorporated by reference in) the disclosure of this application.

TECHNICAL FIELD

This document generally relates to architecture of computer systems.

BACKGROUND

Computers are devices that accept data input, process the data, and provide data output using hardware and software. Computer can be used as control systems for devices, to store and process data, and to respond to queries. Generally, computers are organized into hardware and software components that work together to perform tasks.

Warehouse management systems (WMS) have been developed and used to manage warehouses and supply chains, including managing the movement of inventory. WMS can be used to facility planning, organizing, staffing, and direction of warehouse operations. In many cases, WMS are used when the complexity of a warehouse calls for the systematic documentation of warehouse activities. WMS have traditionally been tightly coupled to the physical environment within the warehouse and the physical resources available to the warehouse, such as equipment (e.g., forklifts), workers, layouts, etc.

SUMMARY

This document generally describes WMS that are capable of pooling orders in a way that accounts for the entire state of a supply chain. In order to do so, a computer system maintains information about logical locations of items—what items are in which containers, what containers are in what other containers, etc. When orders come into the supply chain, a first-pass analysis generates shipping lists that are based on hard-and-fast requirements to move items into other containers (e.g., to other physical locations). Then, a second-pass analysis amends the shipping lists in order to take advantage of available leftover capacity. The shipping lists are used to create tasks that are grouped in ways that make collection of the items easier—a worker can be tasked with collecting items that are near each other in the logical location structure and without having to double back, etc.

In one aspect, a method for operating components of a warehouse management system is used. The method includes maintaining, for an enterprise system in which physical items are stored in physical container and in which physical container are stored in other physical containers, a data system having data records identifying logical items and logical containers that correspond to the physical items and physical containers, the data records further reflecting the storage of physical items and physical containers with other physical containers. The method further includes identifying some of the items as high-priority items to be sent to a particular destination. The method further includes identifying containers to hold the high-priority items in transit. The method further includes identifying excess capacity in the containers that will be unused by the high-priority items when the high-priority items are moved to the containers. The method further includes identifying low-priority items to be sent to the particular destination based on the excess capacity. The method further includes aggregating the high-priority items and the low-priority items into a list of items-to-be-moved. The method further includes using the list of items-to-be-moved, generating a list of tasks includes instructions to move the items-to-be-moved from their respective starting logical locations to the containers. The method further includes distributing the tasks to movers to cause the movers to move the items to the containers.

Implementations can include any, all, or none of the following features. Identifying some of the items as high-priority items to be sent to a particular destination further includes receiving an order from a customer and wherein fulfillment of the order requires moving high-priority items to the particular destination. The method including identifying as high-priority items, responsive to receiving the order from the customer, items below a target stock-level at the target logical location. The method including identifying as high-priority items, responsive to receiving the order from the customer, items not assigned to a customer and that are assigned to the target logical location within a particular time window. Identifying low-priority items to be sent to the particular destination based on the excess capacity comprises: generating an ordered list of items; and identifying items in the order of the list. The ordered list of items is ordered based on one or more factors, the factors including one of the group consisting of profit margin, freshness/date to spoilage, and cost to ship. Distributing the tasks to movers to cause the movers to move the items to the containers includes grouping items-to-be moved based on logical location; identifying movers based on logical location; and assigning tasks to movers based on matches between logical location.

In one aspect, a system includes a processor. The system further includes computer memory containing instructions that, when executed with the processor, cause the system to perform operations includes maintaining, for an enterprise system in which physical items are stored in physical container and in which physical container are stored in other physical containers, a data system having data records identifying logical items and logical containers that correspond to the physical items and physical containers, the data records further reflecting the storage of physical items and physical containers with other physical containers. The operations further include identifying some of the items as high-priority items to be sent to a particular destination. The operations further include identifying containers to hold the high-priority items in transit. The operations further include identifying excess capacity in the containers that will be unused by the high-priority items when the high-priority items are moved to the containers. operations further include identifying low-priority items to be sent to the particular destination based on the excess capacity. The operations further include aggregating the high-priority items and the low-priority items into a list of items-to-be-moved. The operations further include using the list of items-to-be-moved, generating a list of tasks includes instructions to move the items-to-be-moved from their respective starting logical locations to the containers. The operations further include distributing the tasks to movers to cause the movers to move the items to the containers.

Implementations can include any, all, or none of the following features. Identifying some of the items as high-priority items to be sent to a particular destination further includes receiving an order from a customer and wherein fulfillment of the order requires moving high-priority items to the particular destination. The system including identifying as high-priority items, responsive to receiving the order from the customer, items below a target stock-level at the target logical location. The system including identifying as high-priority items, responsive to receiving the order from the customer, items below a target stock-level at the target logical location. Identifying low-priority items to be sent to the particular destination based on the excess capacity includes generating an ordered list of items; and identifying items in the order of the list. The ordered list of items is ordered based on one or more factors, the factors including one of the group consisting of profit margin, freshness/date to spoilage, and cost to ship. Distributing the tasks to movers to cause the movers to move the items to the containers includes grouping items-to-be moved based on logical location; identifying movers based on logical location; and assigning tasks to movers based on matches between logical location.

In one aspect, a non-transitory computer-readable medium containing instructions that, when executed with a processor, cause the performance of operations includes maintaining, for an enterprise system in which physical items are stored in physical container and in which physical container are stored in other physical containers, a data system having data records identifying logical items and logical containers that correspond to the physical items and physical containers, the data records further reflecting the storage of physical items and physical containers with other physical containers. The operations further include identifying some of the items as high-priority items to be sent to a particular destination. The operations further include identifying containers to hold the high-priority items in transit. The operations further include identifying excess capacity in the containers that will be unused by the high-priority items when the high-priority items are moved to the containers. operations further include identifying low-priority items to be sent to the particular destination based on the excess capacity. The operations further include aggregating the high-priority items and the low-priority items into a list of items-to-be-moved. The operations further include using the list of items-to-be-moved, generating a list of tasks includes instructions to move the items-to-be-moved from their respective starting logical locations to the containers. The operations further include distributing the tasks to movers to cause the movers to move the items to the containers.

Implementations can include any, all, or none of the following features. Identifying some of the items as high-priority items to be sent to a particular destination further includes receiving an order from a customer and wherein fulfillment of the order requires moving high-priority items to the particular destination. The medium including identifying as high-priority items, responsive to receiving the order from the customer, items below a target stock-level at the target logical location. The medium including identifying as high-priority items, responsive to receiving the order from the customer, items below a target stock-level at the target logical location. Identifying low-priority items to be sent to the particular destination based on the excess capacity includes generating an ordered list of items; and identifying items in the order of the list. The ordered list of items is ordered based on one or more factors, the factors including one of the group consisting of profit margin, freshness/date to spoilage, and cost to ship.

The systems, devices, program products, and processes described throughout this document can, in some instances, provide one or more of the following advantages. By decoupling elements of a WMS, those elements can be advantageously and more easily designed and upgraded. As such, the technology of computer systems is advanced. Indirect communication where one element of the system is not blocked while waiting for a response from another element allows for less complex design and greater robustness in the face of system errors, network slowdowns, etc. By using a logical location for items and containers tracked by a WMS, a single unified data model can be used for physical locations and objects with very different properties.

DESCRIPTION OF DRAWINGS

Like reference symbols in the various drawings indicate like elements

DETAILED DESCRIPTION

This document describes a warehouse management system (WMS) that includes (a) an inventory management system, (b) a workload management system, and (c) a task management system that are each logically and procedurally independent of each other. Each component may retain and modify data for its own use and may publish that data to other components for consumption but no component modifies the internal data of another component nor is synchronously dependent upon the data modification. Such independence among these components can provide a variety of advantages, including the ability to readily scale each of the components independent of each other, to swap in/out different iterations and versions of each component, and other design/management independence among the components.

For example, these components can operate in a service-oriented architecture that allows for greater flexibility in upgrading and changing the system as time goes forward. Because each unit is self-contained and only communicates through established interfaces, they may be replaced by a new unit without notification or modification of other units. This allows the system to more easily grow as business needs change.

Figure 1:
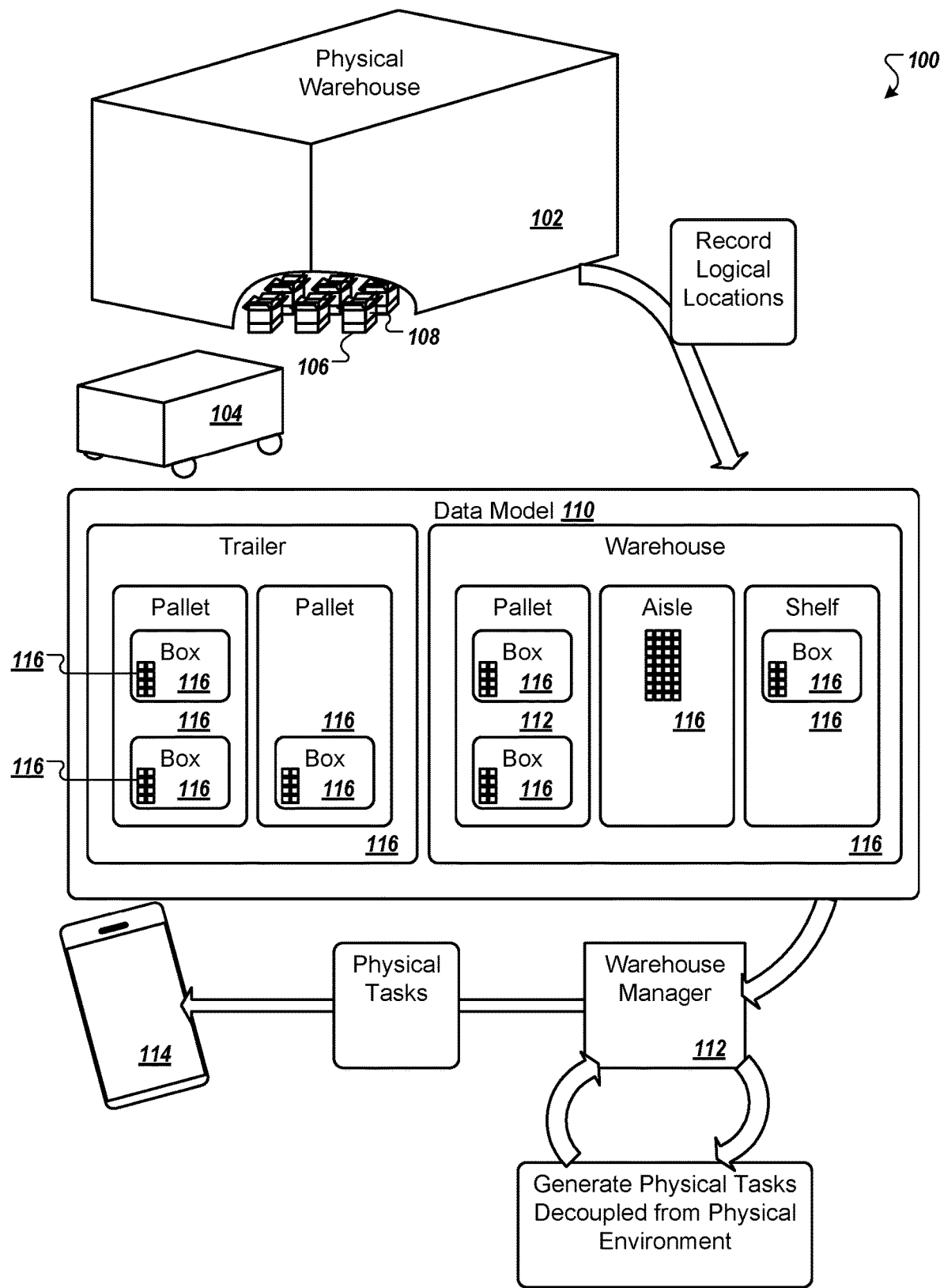
FIG. 1 is a diagram of an example system used in the management of warehouses.

FIG. 1 is a diagram of an example system 100 used in the management of warehouses. In the system 100, data about the status of items in a retail supply chain are tracked and tasks are generated in order to support the function of the retail system. However, a system like the system 100 can be used for any purpose that includes tracking and moving or supplying items at times and places where needed including the distribution of humanitarian aid, military equipment, manufacturing parts, etc.

A physical warehouse 102 and a trailer 104 are two example physical containers used to physically house items that are moved through a supply chain. The warehouse 102 is a stationary permanent building where items are received, stored, and shipped from. The trailer 104 is a mobile structure that can be attached to a truck and transported over roadways. Other example physical containers include shipping containers, train cars, oceanic ships, box trucks, etc.

Other types of physical container include a pallet 106 and a box 108. A pallet 106 is a structure often made of wood or plastic onto which boxes 108 can be stacked and moved with a pallet jack, forklift, etc. Other example physical containers can include bins, bags, dollies, aisles, shelfs, forklifts, pallet jacks, etc.

As can be seen, a physical container can take a wide variety of shapes and sizes. Physical containers can store items and, in some but not all cases, other containers. For example, a toothbrush (an item) can be bundled in a bag (a container) with other toothbrushes (other items). The bag can be stored in the box 108 (a container) on the pallet 106 (a container) in the warehouse 102 (a container) or in the trailer 104 (a container.)

As with any physical object, the physical containers and items can be recognized as having many types of physical properties. Such physical properties include color, weight, size, etc. Physical objects can have recognized physical locations such as latitude and longitude coordinates, an X, Y, and Z location within a building, etc. However, the physical attribution of containers is separated logically from the container tree that models the logical relationships between containers. For example, the toothbrush mentioned above may have a logical location of within bag #2 within box #6 within (or on) pallet #3 within warehouse #2 and that relationship is external to the specific coordinates of any given container.

In order to represent these logical locations, a data model 110 can be recorded. The data model 110 can include data collected and stored on computer systems that allow software to understand logical locations of containers and items within a supply chain. In this example, the data model includes records 116 for physical containers and for items within containers. As shown here, the trailer 104 has a corresponding record in the data model 110. Pallets and boxes within the trailer have corresponding records 116 for items within the boxes. Similarly, there are records 116 for the warehouse 102, the pallets 106, and the boxes 108 and for aisles, shelfs, and items within the warehouse 102.

A warehouse manager 112 can use the data model 110 to generate physical tasks using instructions that are decoupled from the physical environment. For example, the warehouse manager 112 can reference containers and items using the relative location of records 112. These physical tasks can include instructions to pick, move, and place items or containers. For example, a physical task may include instructions to pick the bag of toothbrushes out of the box in which they are located, to remove the toothbrushes from the bag, and to place the toothbrushes into various shipping envelopes. In another example, a physical task may instruct a user to use a pallet jack to remove a pallet from the trailer 104 and move the pallet to the physical warehouse 102.

When a physical task is generated, the physical task may reference the items and containers by their logical location. That is, the physical task may be reference the toothbrushes as being in the warehouse, in a particular row, in a particular pallet, in a particular box etc. The physical task may include instructions to take particular actions such as pick (pick an item or container up), place (placing the picked item in another logical location), etc.

The physical tasks can be transmitted to devices 114 for completion. For example, tasks assigned to human recipients can be sent to mobile computing devices such as cell phones or tablets for display to the human recipients. The tasks can then be formatted in a human-readable display that shows the human recipient what actions are being requested and for which items or containers. In particular, the display can reference the items using their logical locations. In some implementations, the physical tasks can be transmitted to computer-controlled equipment. For example, an automated conveyor belt or pallet-moving robot can be instructed to move a container or item from one logical location to another logical location.

Figure 2:
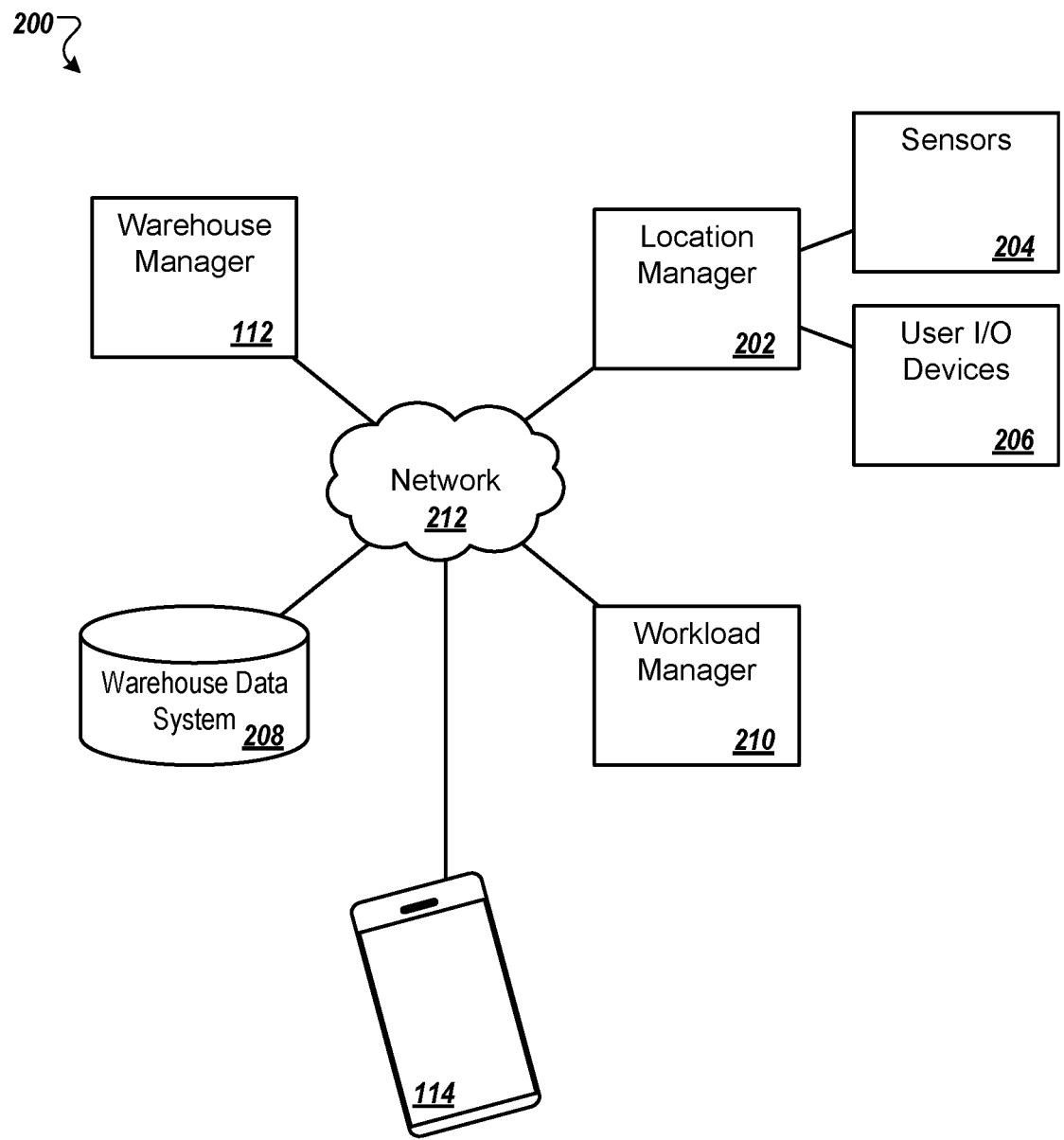
FIG. 2 is a diagram of an example system for managing data in a warehouse system.

FIG. 2 is a diagram of an example system 200 for managing data in a warehouse system. The system 200 can be used with the WMS as described above.

An inventory manager 202 is a computer or computer system or computer that receives signals from multiple sources in order to execute the creation, updating, or deletion of inventory and containers. Input signals could come from various devices including human operated scanners, unmanned sensors like RFID readers, video cameras, barcode scanners, or other system components. Each signal will include identifying data about the physical location, item or container, and/or information about the nature of the activity. The inventory manager 202 can receive these signals and apply logic to translate the signals to updates to the logical inventory container tree. Updates could include the creation of an item or container, the movement of an item or container to another container, a disposition change of an item or container, or the deletion of an item or container.

User I/O devices 206 can be used by the inventory manager 202 to provide output and receive input from users. For example, the user I/O devices 206 can include computers, monitors, keyboards, speakers, computer-mice, tablets and mobile computing devices in data communication with the inventory manager 202. The inventory manager 202 can provide data to a user I/O device 206 (e.g., a GUI) prompting a user to provide input (e.g., entering an item identifier or number of items).

A workload manager 210 can generate work orders using the data model that is stored in the warehouse data system 208. For example, the workload manager 210 may receive a notification that the toothbrushes described above are needed at a different location. In response, the workload manager can access the warehouse data system 208 to determine the logical location of the toothbrushes and to access a logical destination to which the toothbrushes should be moved. The workload manager 210 can generate a series of work orders to be executed (picking the toothbrushes, placing them into a shipping container, placing the shipping container on a trailer, etc.) The work orders can be stored in the warehouse data system 208 and then pushed to user devices 114 of users assigned to the work orders.

Communication for the system 200 can be made through a network 212. The network 212 can include one or more data networks through which elements can pass data messages. The network 212 can be, or can include, the Internet.

As has been described, the warehouse manager 112 and the workload manager 210 are established discretely so that neither element needs to wait on the other. That is, communicating between the two elements takes place asynchronously through the publishing of events to a computer-storage media that can be read within the warehouse data system 208. With the warehouse manager 112 and the workload manager 210 configured to operate without direct communication channels being created or maintained and/or without synchronous communications (that is to say, without waiting for a response or confirmation), the warehouse manager 112 and the workload manager 210 can operate in a way that implicitly assumes the other will operate correctly. This type of configuration provides a number of advantages that overcome possible problems related to computer technology. As will be understood, the warehouse data system 208 can include buffers for other elements of the system 200, may include one or more separate databases, etc.

For example, if the warehouse manager 112 or the workload manager 210 experiences a technical problem and goes off-line for a time, the other element can continue to operate until functionality is restored. This can improve robustness in the face of unexpected downtime and can provide for a less complex upgrade procedure. When one element is upgraded, the other element does not need to also be upgraded. Similarly, this allows for greater scalability. Additional warehouse manager 112 or workload manager 210 instances can be added to the system 200 to handle greater load without needing to notify the other elements.

Figure 3A:
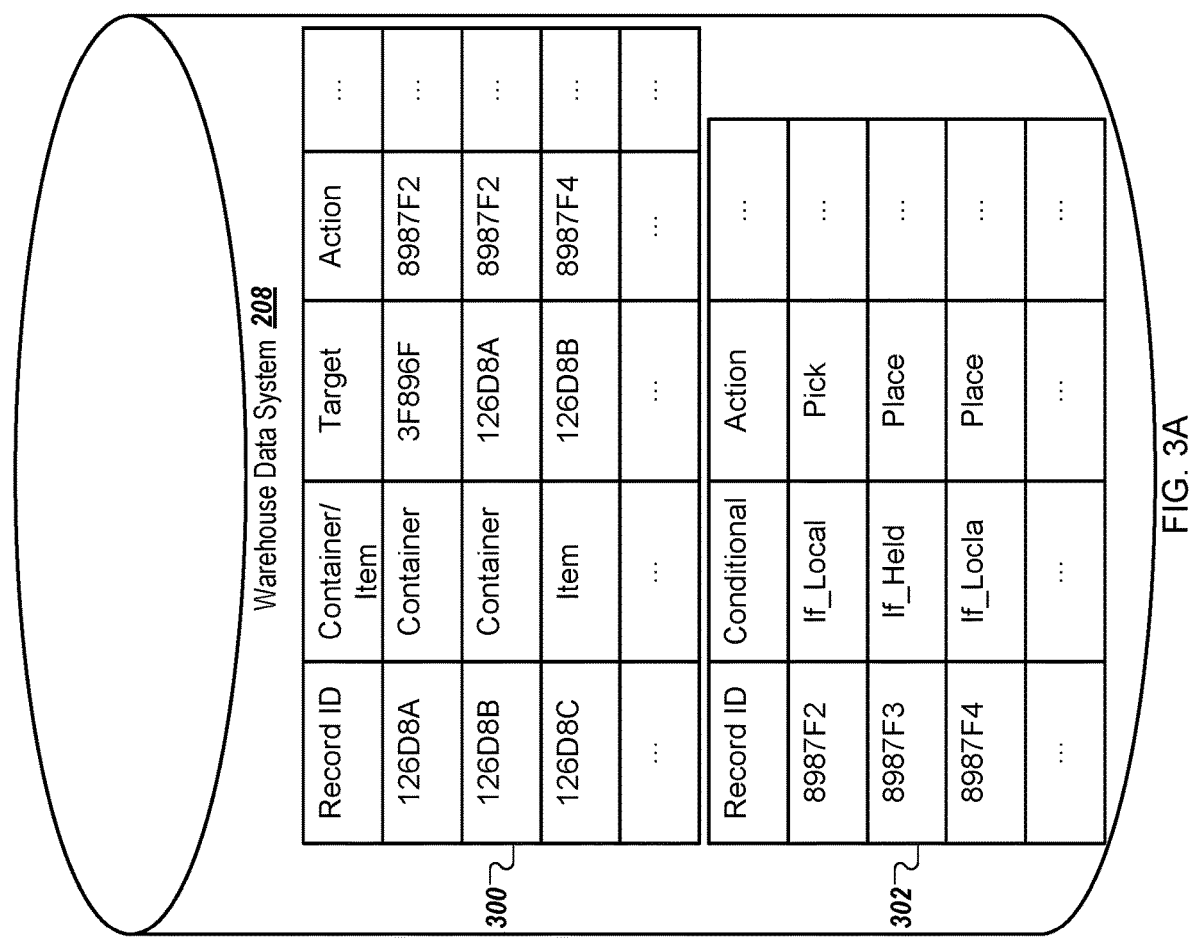
FIGS. 3A and 3B are diagram of an example of data used by a warehouse management system.

FIG. 3A is a diagram of an example of data used by a warehouse management system. In this example, the data described is stored within the warehouse data system 208 in the form of tables of records, with each record having multiple fields. In this example, each row is a different record and each column is a different field. Other forms of data storage can be used.

A table 300 stores data for a data model of a WMS such as the data model 110. Each record in the table 300 corresponds to an action that occurred involving a specific item or container. Each record references the unique identifier of the impacted item or container and the details of the action that occurred. Actions can include creation of an item or container, movement of an item or container to a different container, change in status of the inventory or container, or the removal of the inventory or container from the system. The action records can be aggregated to determine the current logical state of any given leaf or branch in the item container tree. This allows for historical and current item and container state to be stored concurrently. Additionally, other logical views can be created to answer specific questions of import to system functions. Examples include, "what are the containers in which this item exists," and "what items exist in this container."

As shown here, the data representing the logical location of the item comprises no data explicitly indicating the physical location of the target item. However, other formats for the data are possible, including other formats that may not be easily parsed, that are not sequential, and/or that explicitly indicating the physical location of the target item.

A table 302 stores data for tasks of the WMS such as those generated by the workload manager 210. Each record in the table 300 corresponds to as single task in the WMS. In some examples, each record can contain a tree structure of actions that defines the task. Each task tree has a "point of entry" that indicates how a user or machine would initiate the task. Once initiated, the task tree has a series of possible actions, each triggered by a specific input provided by a human user, machine, or system event. Actions can have validations and next possible actions. Collectively, the point of entry and the actions tree enable the execution of the task and variants of the task.

For example, the task with the "Record ID" of 8987F2 specifies that the task should determine if a conditional function "If Local" returns TRUE or FALSE and, if TRUE, perform a "Pick" action If FALSE, and for operations after the Pick, further columns in the record can specify operations.

When rendered for display on a user device, this task may be displayed using information from the record "8987F2" and from the record for the item "126D8C," with sufficient detail to instruct a user to complete the task. This information may include additional information from the records such as a descriptive name (e.g., "toothbrush"), a photograph, a brand name, a color, or the fully qualified logical location of the item. For example, the task may be displayed as "Pick the ExampleBrand Toothbrush number 126D8C from the bag 126D8B in aisle 126D8A."

Figure 3B:
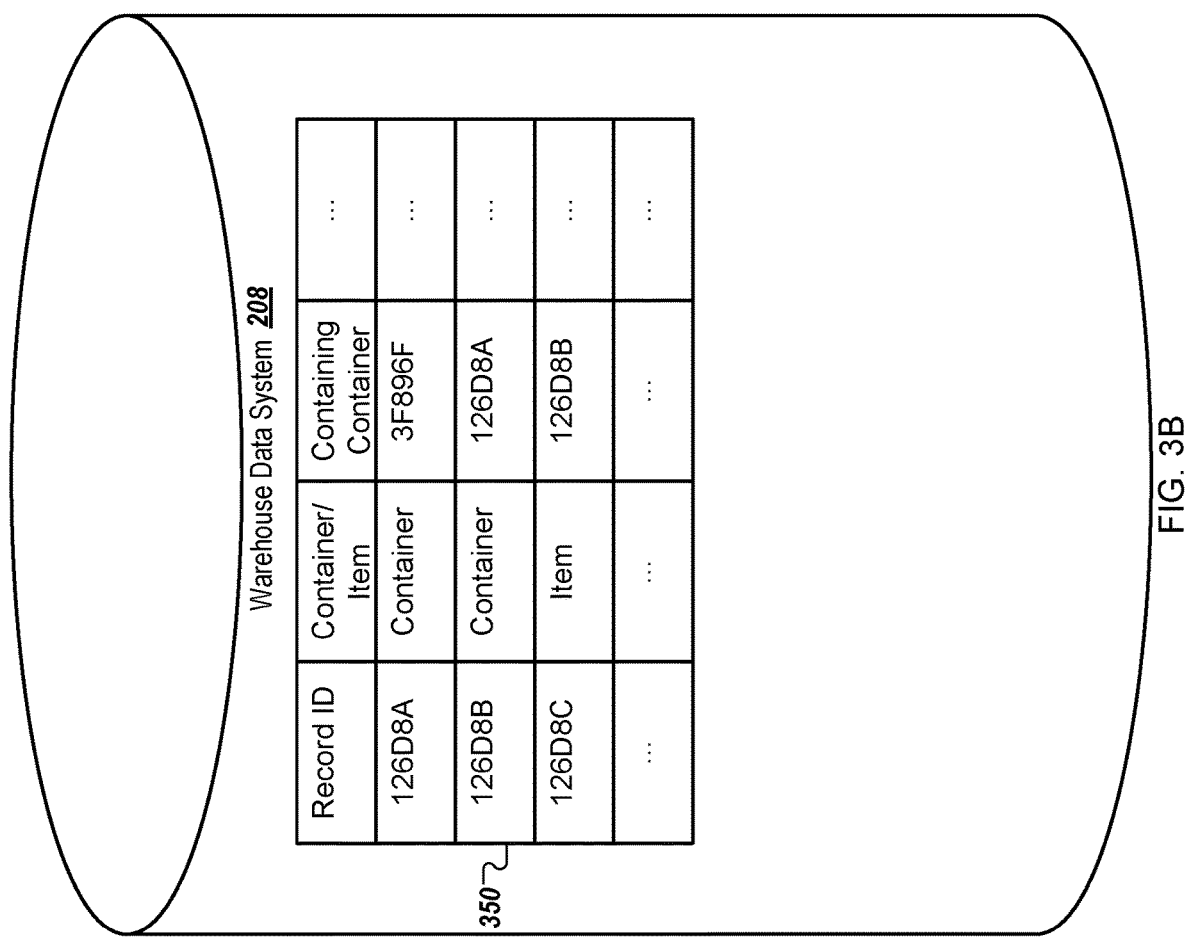

FIG. 3B is a diagram of an example of data the can be used by a warehouse management system. The data in FIG. 3B can be used in addition to or in the alternative to the data of FIG. 3A.

A table 350 stores data for a model of a WMS such as the data model 110. Each record in the table 300 corresponds to a single container or a single item in the WMS. Each record includes a data field for a "Record ID." The "Record ID" is a unique identifier that uniquely identifies the record in the table 300. That is to say, no "Record ID" is a duplicate. A data field "Container/Item" stores data that records if the associated contain or item is in fact a container or if it is instead an item. A data field "Containing Container" stores data that records the container that is currently containing the item or container that the record corresponds to. For example, if record 126D8C corresponds to one of the toothbrushes, this record lists the "Containing Container" as 126D8B. The record with the "Record ID" 126D8B corresponds to the bag containing the toothbrush.

Using the table 300, logical locations of items and containers can be identified. In some cases, the logical location can be express a sequence of identifiers that each correspond to containers that contain the item. For example, the logical location of the toothbrush may be expressed as "126D8A\126D8B\126D8C." This string uniquely and fully describes the logical location of the toothbrush in a format that can easily be parsed by a computer processor in order to gain access to the information specifying the logical location. As such, the sequence of identifiers is an ordered sequence of identifiers that represent an ordering of containers around the item.

Figure 4:
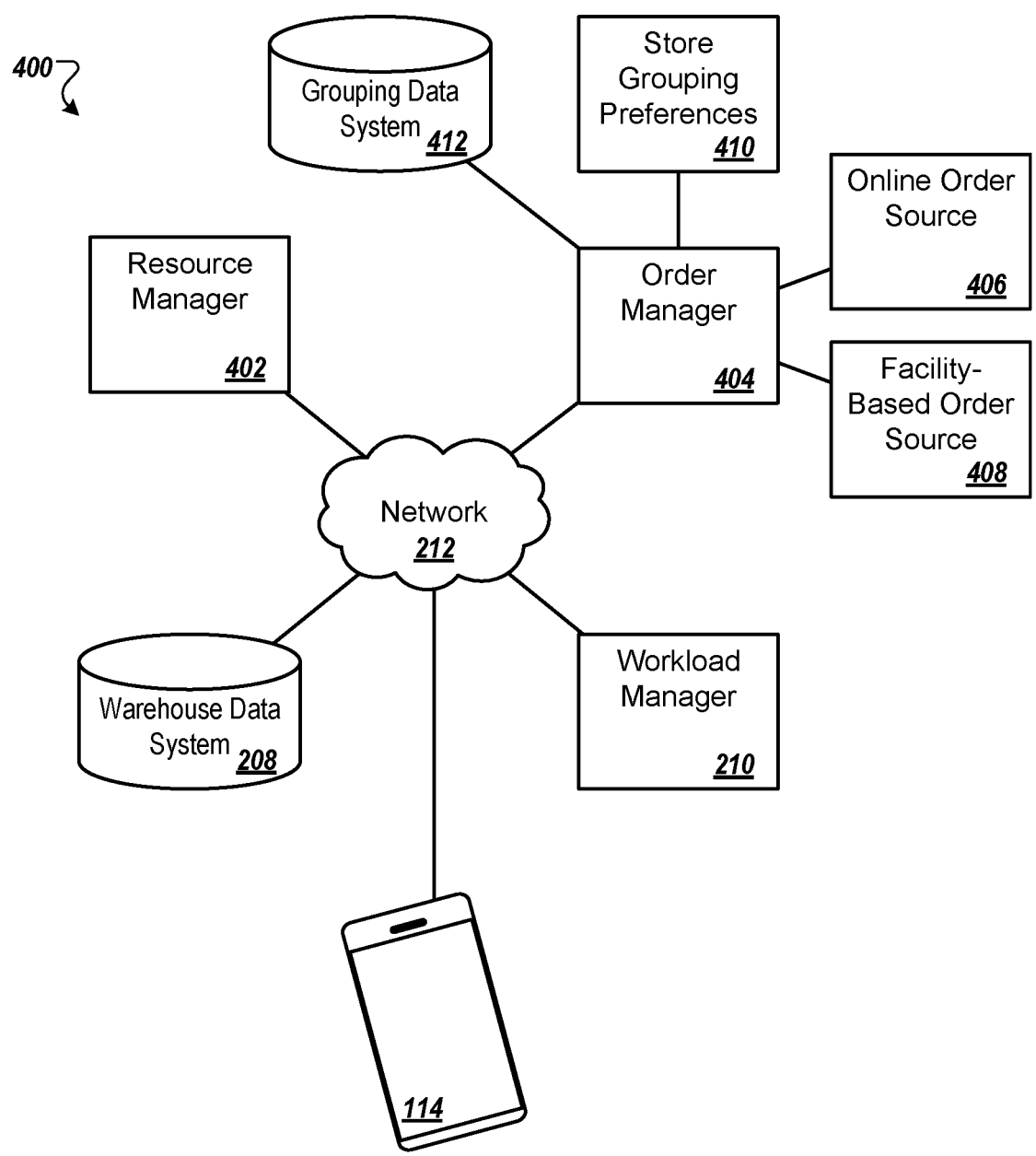
FIG. 4 is a diagram of an example system for workload management.

FIG. 4 is a diagram of an example system 400 for workload management. The system 400 can be used in conjunction with the system 200 for WMS operations, and in fact, the example shown uses some of the same components. It will be understood that implementations of a WMS can include up to all elements of the system 200 and 400 working together for WMS purposes.

The workload manager 210 is responsible for generating tasks for users and resources of the warehouse system. A resource manager 402 is responsible for managing data related to those users and resources. For example, the resource manager 402 can record, in the warehouse data system 208, data identifying employee or user names, job descriptions, scheduling, task capabilities, etc. The resource manager 402 can also or alternatively record, in the warehouse data system 208, data identifying non-human resources. For example, vehicle information, fixture information (e.g., shelving, bins, carts), and facility information (e.g., warehouse physical location, doorway status, security status, sensor data) can be managed by the resource manager 402 in the warehouse data system 208.

Order data can be managed in the warehouse data system 208 by an order manager 404. Orders can include requests from inside or outside the WMS that request some action to be accomplished. For example, an order may be a request to provide a distribution center with a number of toothbrushes by a particular day so that they can be loaded to a trailer and moved to a distribution endpoint (e.g., a retail store, a dental clinic). Another type of order is a purchase order. For example, a customer of the retail store may purchase a toothbrush online or at a retail store that is currently out-of-stock, and the order may call for the toothbrush to be moved to the retail store or shipped directly to the customer's home.

Orders can come into the order manager 404 through one or more channels. An online order source 406 can receive orders from online sources (e.g., websites, applications). For example, a customer can purchase a toothbrush from a retail application running on their mobile computing device, or the dental clinic can place an order for delivery of a supply of toothbrushes when the dental clinic's stock is low.

A facility-based order source 408 can receive orders from user input within a facility or from users associated directly with the WMS. For example, one of the users who works for the WMS (and thus has data managed by the resource manager 402) may use a user-interface in a warehouse to generate an order to move assets. For example, the toothbrushes discussed above may be received from a manufacturer at a warehouse, and the user may generate an order to disburse the toothbrushes to different warehouses across the country in preparation for future needs.

The order manager 404 may place data of orders into the warehouse data system 410, and the workload manager 210 can then access the data of the order and generate tasks from the order data. For example, in order to complete an order requiring the toothbrush to be moved to a different warehouse, the workload manager 210 can generate tasks to pick the toothbrush in the first warehouse, place the toothbrush in a box on a pallet scheduled to be placed on a trailer, pick the pallet off the trailer at the destination warehouse, and place the pallet in the destination warehouse.

As has been described, the workload manager 210, resource manager 402, and the order manager 404 can be configured so that no element needs to wait on the others. That is, communicating between the elements may take place only indirectly through the storing and reading of data within the warehouse data system 208. With the workload manager 210, resource manager 402, and the order manager 404 configured to operate without direct communication channels being created or maintained, the workload manager 210, resource manager 402, and the order manager 404 can operate in a way that implicitly assumes the others will operate correctly. This type of configuration provides a number of advantages that overcome possible problems related to computer technology.

For example, if the workload manager 210, resource manager 402, or the order manager 404 experiences a technical problem and goes off-line for a time, the other elements can continue to operate until functionality is restored. This can improve robustness in the face of unexpected downtime and can provide for a less complex upgrade procedure. When one element is upgraded, the other element does not need to also be upgraded. Similarly, this allows for greater scalability. Additional the workload manager 210, resource manager 402, and the order manager 404 instances can be added to the system 200 to handle greater load without needing to notify the other elements.

The order manager 404 can utilize store-specific data to generate and pool orders. Store grouping preferences 410 can provide the order manager 404 with data about store-specific preferences related to the retail environment layout. For example, various stores can provide data to the order manager 404 that define the layout of the store and adjacency data that shows elements of the layout that are near each other. The order manager 404 can record this data in grouping data system 412. Two examples of this kind of data are shown with respect to FIG. 8 below, although other forms and formats are possible.

Figure 5:
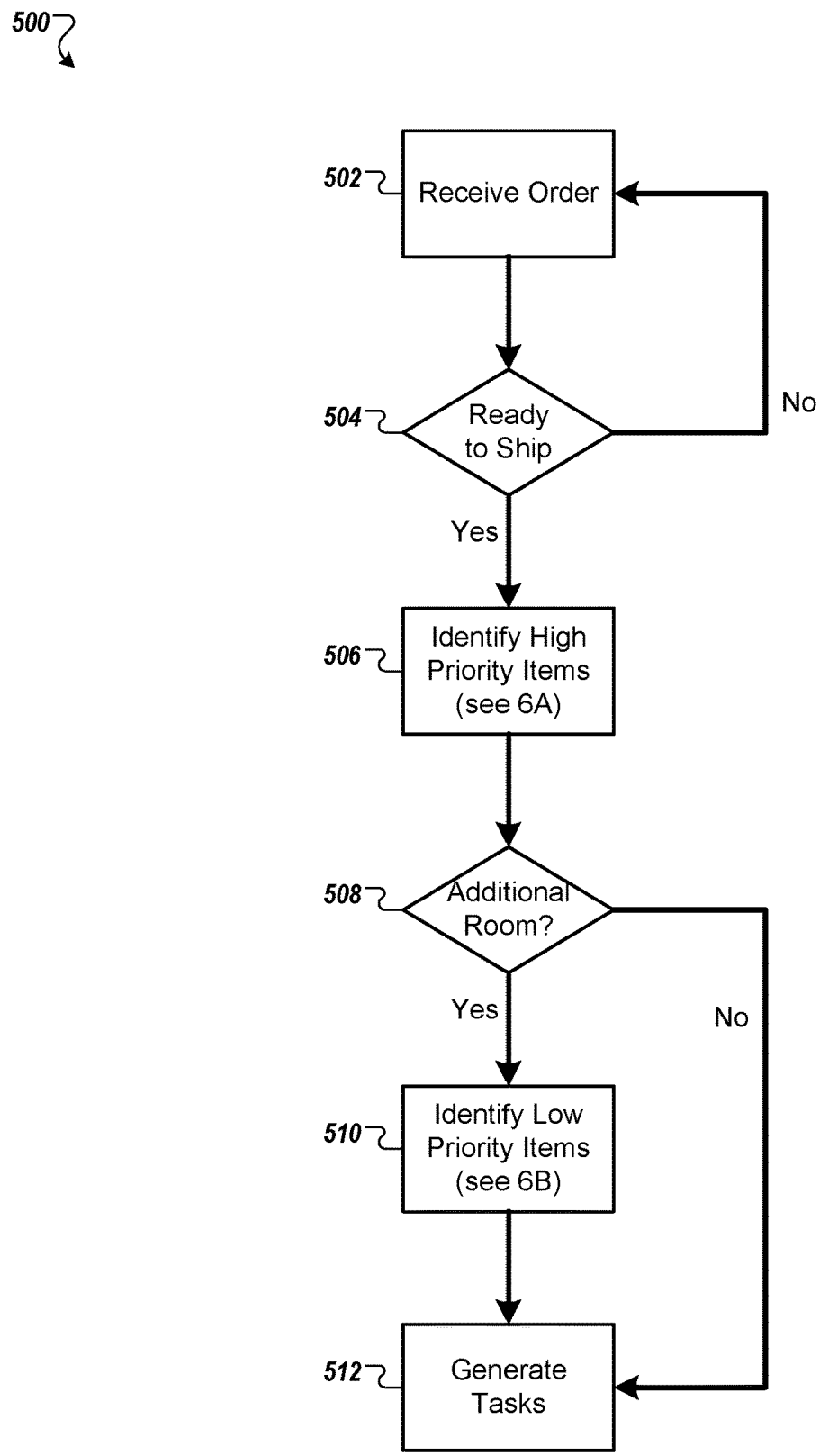
FIG. 5 is a diagram of an example process for physical task generation.

FIG. 5 is a flowchart of an example process 500 for generating tasks based on orders received in a WMS that tracks logical locations. The process 500 can be used, for example, with a WMS as described with respect to FIGS. 1-4 and as such will use elements of FIGS. 1-4 in the description of process 500. However, another system or systems can be used to perform the process 500 or another similar process.

An order is received 502. For example, the order manager 404 can receive orders from inside or outside of the supply chain. The online order source 406 can allow a customer of the supply chain to order an item to be picked up at a particular retail location. At the same time, the facility-based order source 408 can allow internal orders to be generated.

In one example, a new video-game console is set to be released on November 1. In the week leading up to that date, a retail chain enables pre-order of the console on their website (i.e. to be sent via the online order source 406). During this time, fifty pre-orders are placed to be picked up at one particular store. Also in the week leading up to that date, the retail chain uses the facility-based order source 408 to schedule one hundred units of the console to be shipped to the same particular store.

Data related to these orders can be stored in, for example, a warehouse data system such as the warehouse data system 208. This data may be added by the location manager 202 transmitted over the network 212 and accessed by other elements over the network 212. In this way, information about the orders may be made available to other elements without direct communication with the order manager 404.

If the order is not ready to ship 504, more orders are received 502. For example, while the preorder period is open, new orders that come in can be added to the warehouse data system 208 one-at-a-time or in batches. Additionally, one or more orders from the facility-based order source 408 can be added to the same warehouse data system 208.

Items may be ready to ship when the items are made available to the warehouse management system, when an expected delivery date is confirmed, etc. In the case of the video game console preorders, the supply from the manufacturer may be set for October 28, which may be used as the data for the orders to ship to the stores.

If the order is ready to ship 504, high-priority items are identified 506. For example, all orders that specify items are to be shipped to a particular store can be identified by the workload manager 210. As these orders are made from customer requests or specific requests from within the supply chain, they may be considered high-priority. In this example, that includes the one hundred fifty consoles, plus orders for a variety of other items sold by the retail establishment. As such, some of the orders are for the console, some orders are for items that are out-of-stock at the store, some orders are for seasonal items that need to be in the store by a particular date. Other orders could be classified as high-priority, depending on the priorities of the supply chain. For example, a humanitarian-relief supply chain could classify potable water as high priority and not classify clothing as high-priority, if there was a humanitarian crisis in a hot and dry environment.

If there is additional capacity with the high-priority items 508, low-priority items are identified 510. For example, with all the high-priority orders identified, the workload manager 210 can assign items of the orders to be shipped in containers. The containers may have given capacities recorded in terms of volume, weight, etc., and each item may have recorded volume, weight, etc. The workload manager 210 can access this data in the warehouse system 208 and allocate items to containers, tracking the used and unused capacity of each container.

If one or more of the containers have sufficient residual capacity after adding the high-priority items, the workload manager 210 can assign low-priority items to the residual capacity in the containers.

For example, the workload manager 210 can identify items at-risk for being low in inventory at the destination, items with a high profit margin, non-essential care items to compliment life-saving items, etc. The workload manager 210 may then add a number of those items to the containers in order to utilize the containers.

If there is not additional capacity with the high-priority items 508, or after low-priority, items are identified 510, tasks are generated 512. For example, the workload manager 210 can store the list of items and containers in the warehouse data system 208. The resource manager 402 can access the list of items and containers, and can generate a list of tasks that need to be accomplished to move the items from their current logical location to the container's logical location. These tasks can be distributed to movers (e.g., human workers, autonomous material handlers) to move the items as requested by the tasks.

As can be seen, this process can be used to generate tasks lists that take into account a holistic view of the supply chain. Tasks to move similar objects can be generated based on efficiency of the tasks. That is, low-priority goods can 'piggy-back' on capacity that is unused by the consoles, thus allowing for greater utilization of the supply-chain resources. If the example also includes twenty low-priority consoles in addition to the one hundred fifty high-priority consoles, the task lists may present that to the users as a single task to move one hundred seventy consoles, which would be more efficient than a task to move fifty consoles, then a task to move one hundred, then a task to move twenty.

Figure 6A:
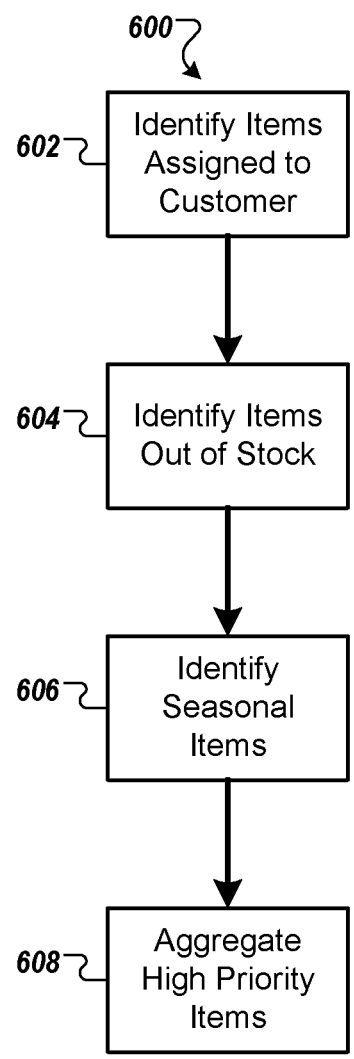
FIGS. 6A-6C contains flowcharts of example processes for generating tasks based on orders received in a WMS that tracks logical locations.
Figure 6B:
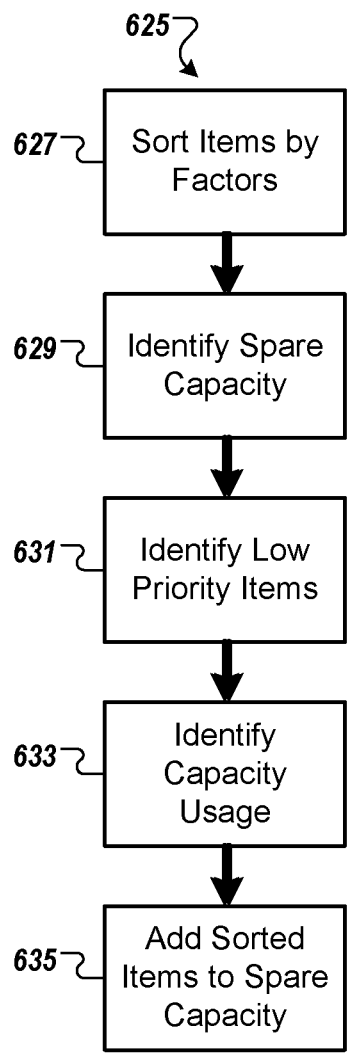
Figure 6C:
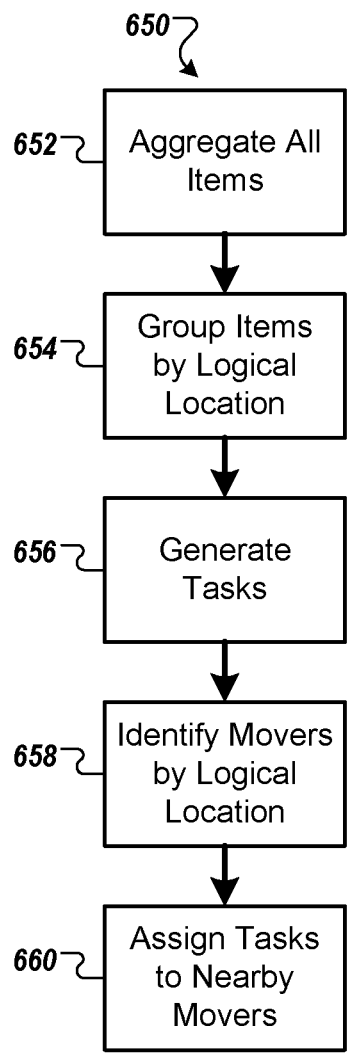

FIGS. 6A-6C contains flowcharts of example processes 600, 625, and 650 for generating tasks based on orders received in a WMS that tracks logical locations.

The process 600 describes operations that can be used to identify high-priority items 506, and thus may be used as part of the process 500. However, identifying high-priority items 506 may be done in other ways in some cases. In this example, priority is assigned by based on the fact that the organization at issue is a retail organization. Therefore, choices in prioritization have been made in furtherance of the retail organization. In a different kind of organization (e.g. a humanitarian aid organization) different prioritizations may be used. For example, immediate life-saving supplies may be given a higher priority than comfort items; as such, a prioritization may better fit the aid mission.

Items assigned to customers are identified 602. For example, a rule stored in the warehouse data system 208 may identify customer-orders as having the highest priority. Therefore, the workload manager 210 may first work to fulfill those orders. In order to do so, the workload manager 210 can access all outstanding customer orders for a particular store and create a list of items and counts for those orders. This list of items and counts can be stored locally by the workload manager 210 or in may be stored in the warehouse data system 208.

Items out of stock are identified 604. For example, the workload manager 210 may then follow the rule, which species that out-of-stock items for the same location should be treated as high-priority items. As such, the workload manager 210 can access inventory levels for the location in the data model 110 in the warehouse data system 208. These inventory levels are compared to minimum inventory levels, and any inventory level lower than the specified level can be identified as out of stock. The workload manager 210 can add the out of stock items, along with count, to the list of items and counts to be sent to the location. As will be understood, duplicates in this list can be handled by combining the items needed, so in the case of fifty preordered consoles and one hundred needed to bring the stock up, the list may store this as one hundred fifty consoles needed.

Seasonal items are identified 606. For example, the rules may next specify that seasonal items should be shipped to the location. The rules specify that an extra thirty consoles should be sent to the store as seasonal items, and thus the workload manager 210 can add twenty to the count of consoles needed, up to one hundred eighty.

One example item is described above, but it will be understood that this process will often be used for many items simultaneously. For a retail system, that could include video game consoles, toothbrushes, motor oil, etc. Nevertheless, these heterogeneous items may all be treated similarly in some facets (e.g., the order in which high-priority goods are assigned) and homogeneously (e.g., the types of containers to which each item can be assigned—motor oil not being assignable to bags, as one example.)

The process 625 describes operations that can be used to identify low-priority items 510, and thus may be used as part of the process 500. However, identifying low-priority items 510 may be done in other ways in some cases. In this example, priority is assigned by based on the fact that the organization at issue is a retail organization. Therefore, choices in prioritization have been made in furtherance of the retail organization. In a different kind of organization (e.g. a humanitarian aid organization) different prioritizations may be used. For example, immediate life-saving supplies may be given a higher priority than comfort items; as such, a prioritization may better fit the aid mission.

Low-priority items are sorted by one or more factors 627. For example, the workload manager may access all available items stored in the same location as the high-priority items by finding all items in the same logical location in the data model 110. Then that list of items may be sorted by one factor or a combination of factors. The factors may include profit margin, freshness/date to spoilage, cost to ship, etc. This sorting will produce a ranking of items according to the factors—most profitable, least window to sell before spoilage, lowest cost, etc.

Spare capacity in containers is identified 629. For example, the workload manager 210 can access data in the warehouse data system 208 to identify all containers to hold high-priority items and identify the unused capacity in those containers. This capacity may be marshaled into a new list by the workload manager 210 for use here.

Sorted items are added to the spare capacity 635. For example, the workload manager can assign to the containers items from the sorted list of items, beginning with the start of the list which contains the most profitable, least window to sell before spoilage, lowest cost, etc. and add these until each container is full, does not have more than a threshold level of unused capacity, etc.

The process 650 describes operations that can be used to generate 512, and thus may be used as part of the process 500. However, generating tasks 512 may be done in other ways in some cases. In this example, tasks in this example are only made for human movers and not automated material handlers. Therefore, tasks will be described in terms of human action. In a different kind of organization (e.g. one with automated material handling) different tasks can be generated.

All items to be shipped are aggregated 652. For example, the workload manager 210 can access the list of all items, both high-priority and low-priority, to be shipped from the warehouse data system 208. Items are grouped by logical location 654. For example, the workload manager 210 can access the data model 210 in order to identify items on the list based on their logical location, and then sort the list by logical location. In doing so, this sorted list will result in items in the same containers being grouped together.

Tasks are generated 656. For example, with the starting logical location known and the logical location of the assigned shipping container tasks to move the items from the starting logical location to the logical location of the assigned shipping containers can be generated by the workload manager 210.

Movers are identified by logical location 658. For example, with these tasks generated, the resource manager 402 identify movers (e.g., workers) that are physical near the items as potential movers to whom those tasks can be assigned.

Tasks are assigned to nearby movers 660. For example, the resource manager 402 can assign the task to the movers based on the capabilities and available of the movers. This may include making the tasks available for viewing on a mobile computing device assigned to each mover.

Figure 7:
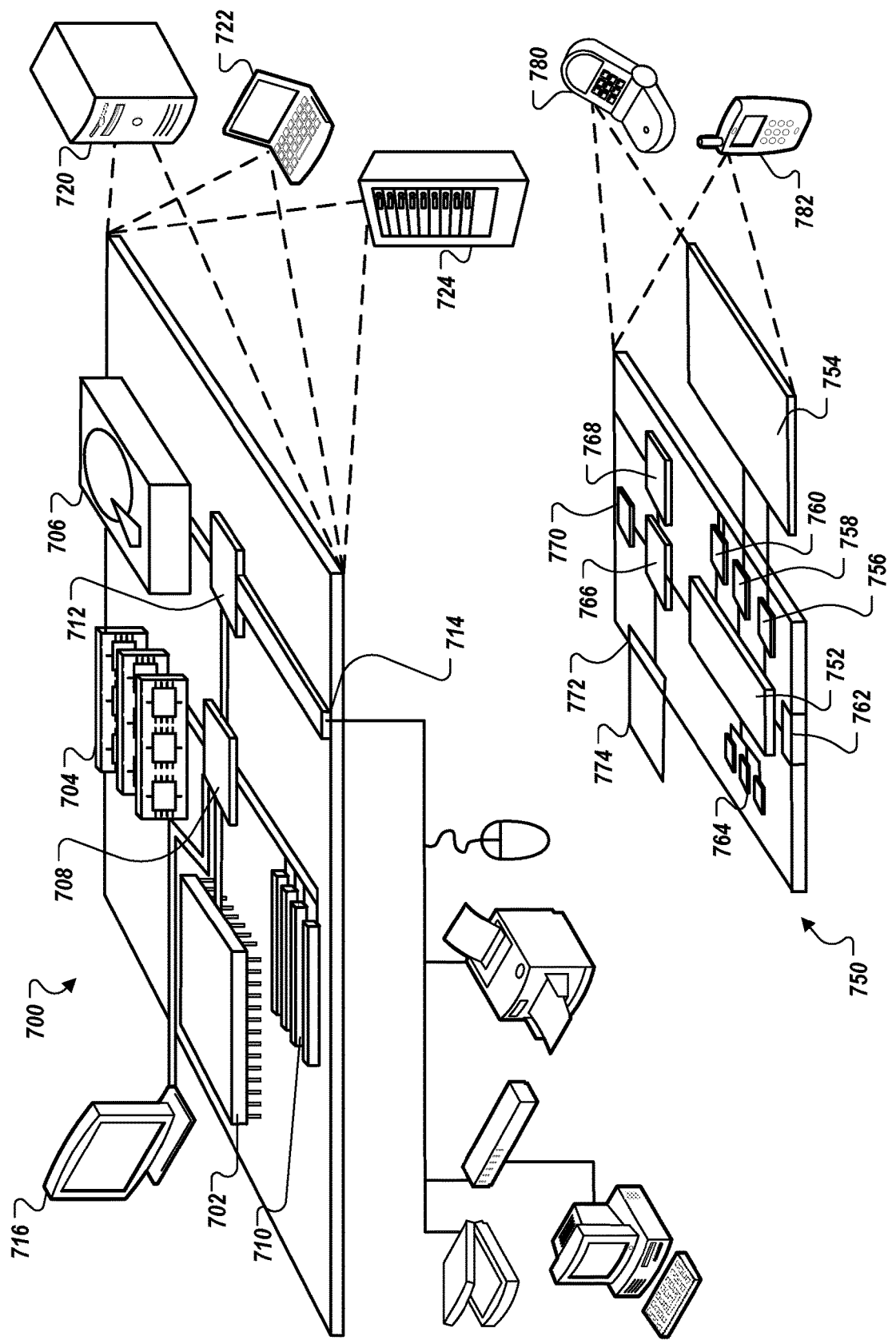
FIG. 7 is a schematic diagram that shows an example of a computing system.

FIG. 7 shows an example of a computing device 700 and an example of a mobile computing device that can be used to implement the techniques described here. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described throughout this document. The computer program product can also be tangibly embodied in a computer or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described throughout this document, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described throughout this document. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MIMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Figure 8:
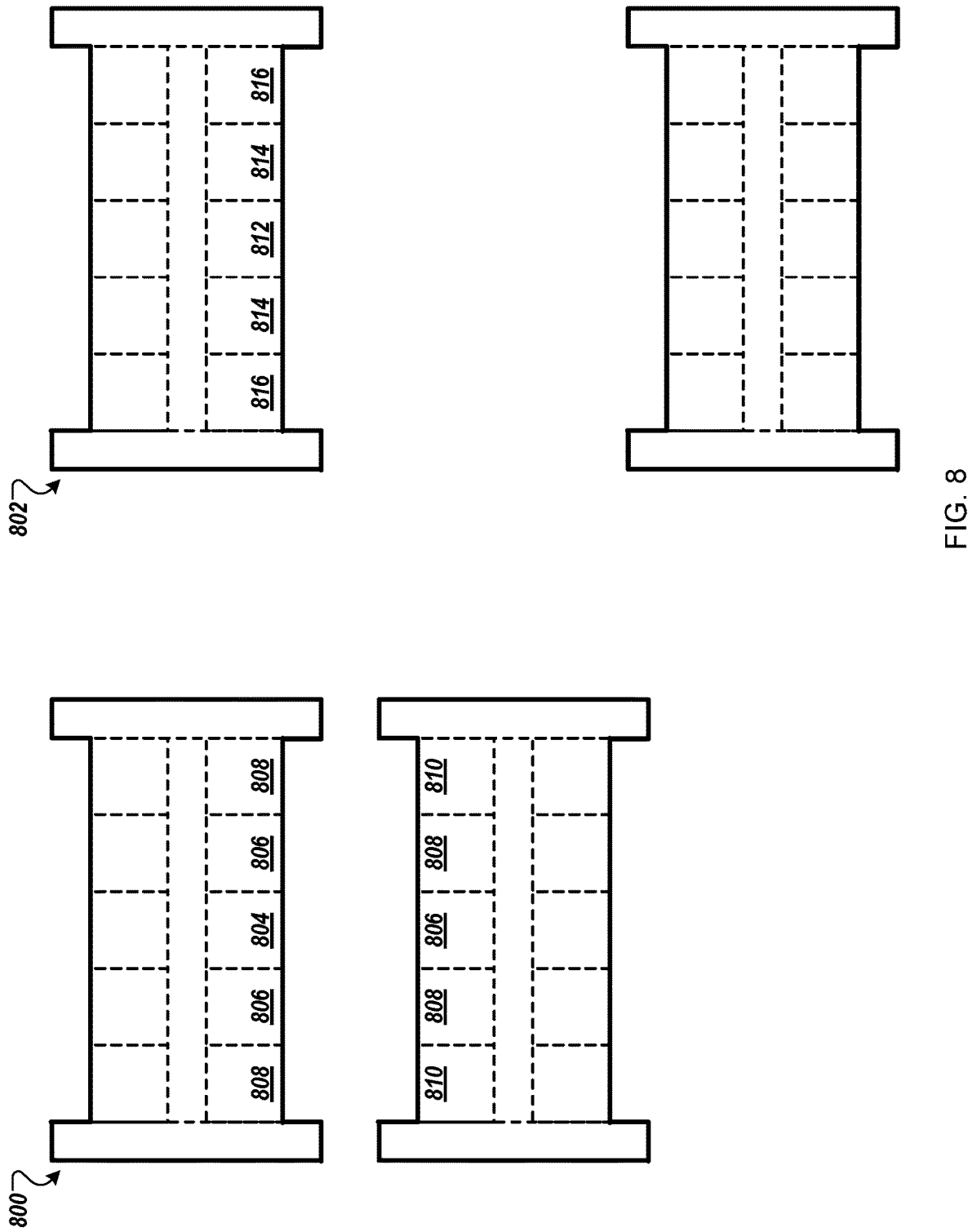
FIG. 8 is a schematic diagram of retail store layouts.

FIG. 8 is a schematic diagram of retail store layouts. In layout 800, a retail store has shelves that are arranged near each other, forming an isle between the shelves. In a different store, a layout 802 has shelves that are arranged father apart from each other, with a large, open space in between that can be used for non-shelving purposes (e.g., displays, sample stations, seating).

In the layout 800 and 802, each shelf is divided into sections (shown with dotted lines). Data (e.g., storable on computer memory) can be generated and used to identify shelf sections that are near each other for purposes of order pooling. For example, when an order specifies that an item is to be shipped to be stocked on a particular shelf section, other orders for other items destined for nearby shelf sections can be pooled into the same shipping container.

In the layout 800, data records distances from shelf section 804. In this layout 800, the three nearby sections 806 are identified as immediately near the section 804. Additionally, three sections 808 are identified as further away than sections 806, and two sections 810 are identified as further away still. As will be understood, the layout 800 shows that shelf sections to the side and directly opposite the isle of a given shelf sections are considered adjacent.

In the layout 802, however, the adjacency data for section 812 identifies nearby sections 814 and then 816 only in the same shelf. As previously mentioned, the other shelf is father away and there may be retail elements (e.g., displays, sample stations, seating) in the way, preventing quick traversal from one shelf to the other. To reflect this fact in the physical retail store, the data for the layout 802 does not identify shelf sections opposite 812 as being near.

Figure 9:
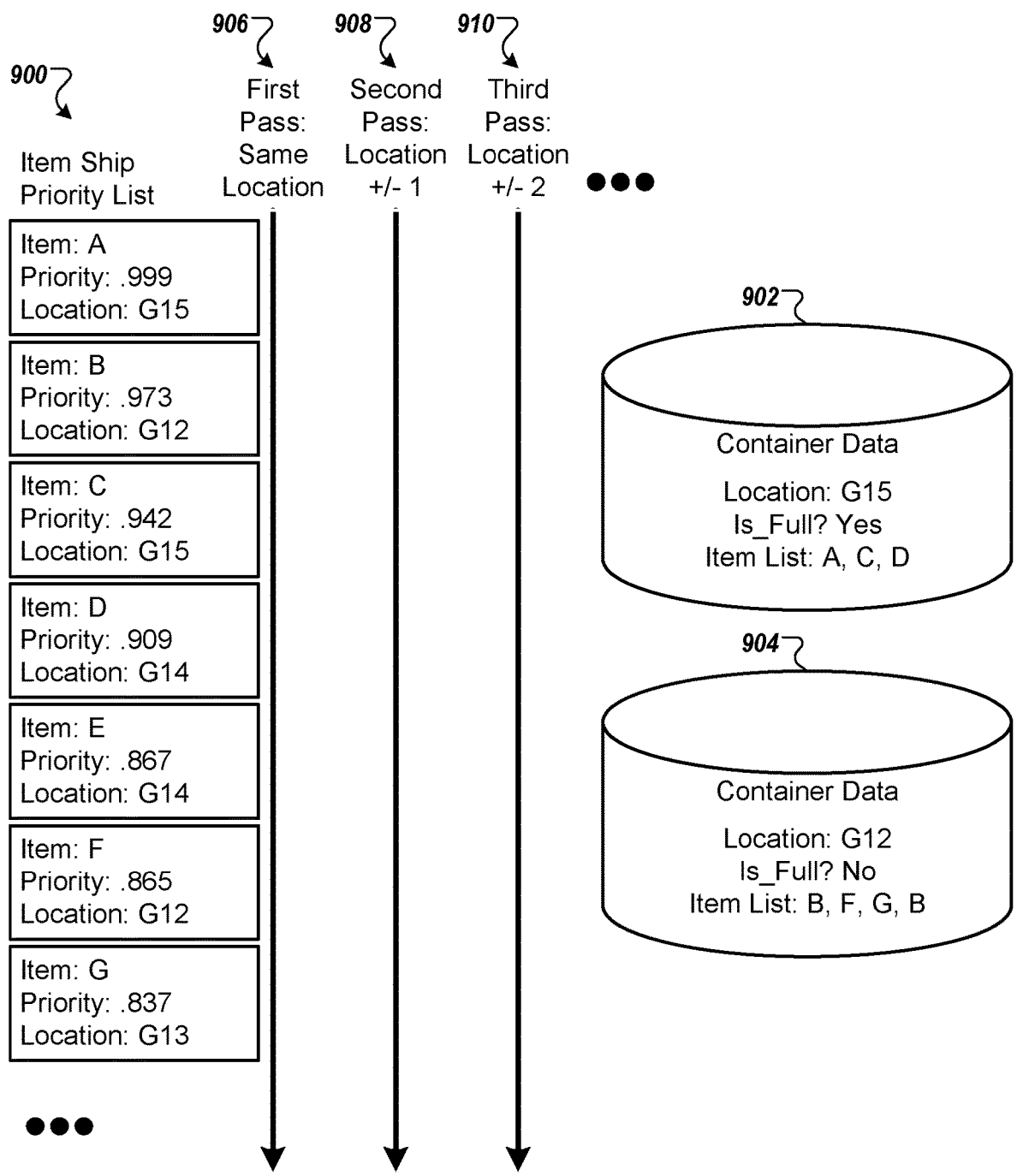
FIG. 9 is a diagram of an example of data used by a warehouse management system.

FIG. 9 is a diagram of an example of data used by a warehouse management system. The data shown here can be stored in computer memory for use in the processes described in this document by computer systems.

A priority list 900 records a group of orders that all define movement of items to a single location or related locations. In this example, the priority list records items in a fulfillment center to be shipped to a single retail store. Each item in the list has an associated priority value and location, and in other examples, more or less metadata may be used as needed.

The priority value is a value that records the importance of a particular order. In this example, a maximum priority value of 1,000 and a minimum value of 0 is used. The items in the list or sorted according to this priority. As such, high priority orders are given a priority value near 1,000 and are near the beginning of the list.

The location value is the location in the destination into which the item will be placed. In the case of a retail store, the location can be a shelf location (e.g., locations 804-816).

The orders in the priority list 900 can be used to assign the corresponding items into container data 902 and 904. For example, by assigning an item to a container, a task can be generated to instruct a mover to move a corresponding physical item into a corresponding physical container. In order to populate the containers 902 and 904, one or more passes may be made through the priority list 900.

In a first pass 906, the first un-completed item in the list, which has the highest priority, can be assigned to the first container 902. Then, other items in the priority list with the same location data can also be assigned to the container 902. As such, in the first pass 906, item A can be assigned to container 902. Then other items at the same location G15, that is, item C, can be assigned to the container 902.

Subsequent passes 908 and 910, etc. can be performed to assign items to the container in progressively further locations from the original item. For example, in the first pas 906, items in an initial location 804 are assigned, then items in any of the three locations 806 are assigned, then in any of the four locations 808 are assigned, etc. These passes may continue for a given number of passes, until a container is full, until a particular distance is achieved, etc.

As each item is assigned to the container 902, that item can be removed from the priority list 900 or marked as assigned. Then, the passes 906-910 can be repeated for another contain 904 until, for the container 904, a given number of passes are performed, until a container is full, until a particular distance is achieved, etc. This container-filling may be repeated until all items in the priority list 900 are assigned, until all containers are filled, etc.

Figure 10:
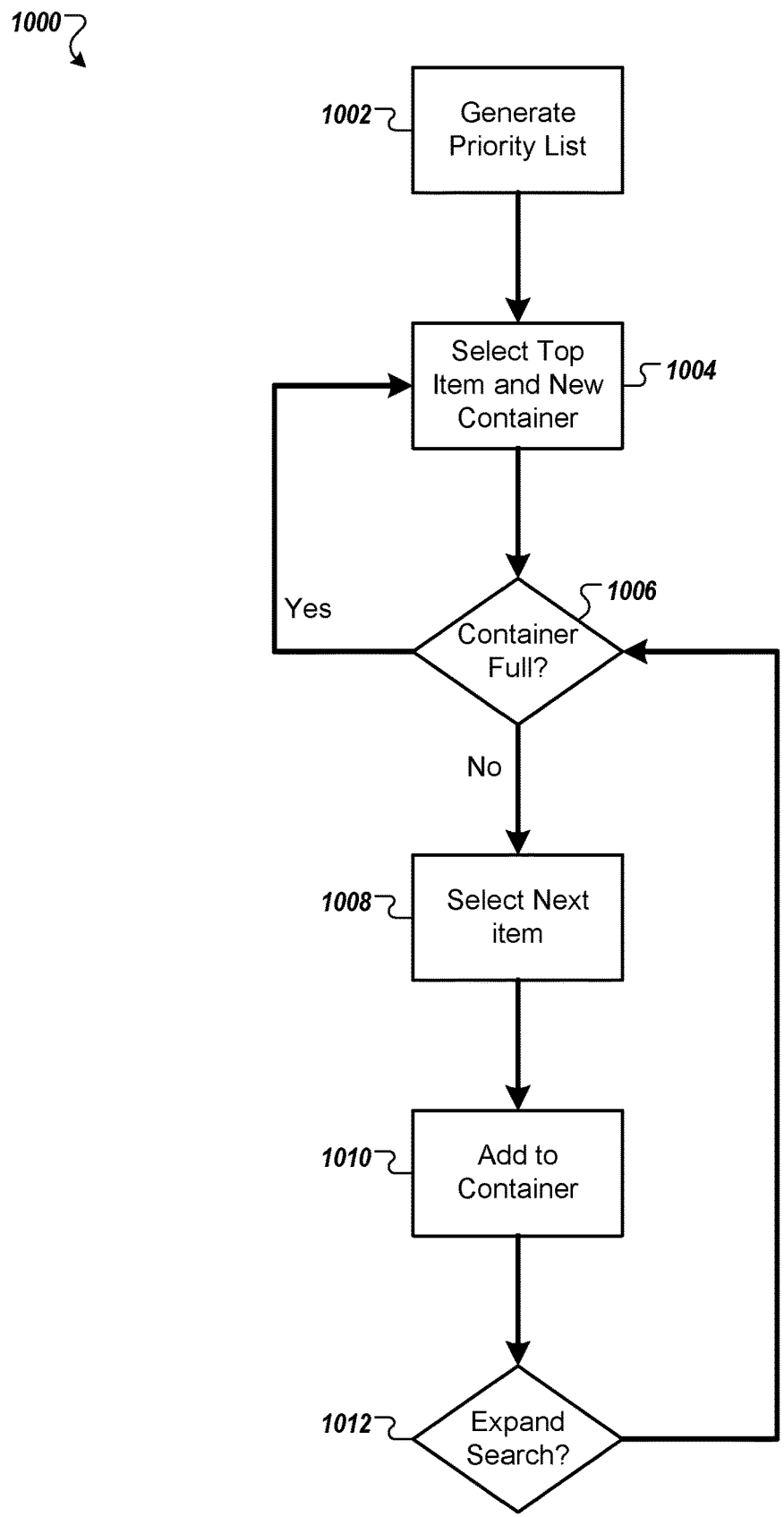
FIG. 10 is a flowchart of an example process for assigning items to containers.

FIG. 10 is a flowchart of an example process 1000 for assigning items to containers. The process 1000 can be used, for example, by the order manager 404 using the data 900, 902, and 904.

A priority list of items is generated 1002. For example, the order manager 404 can generate a list of items to be shipped to one or more locations (e.g., retail stores). The order manager 404 can assign each item a priority value by executing a priority function using metadata for the item, order, location, etc. The order manager 404 can then order the list by priority, or in some cases the list may be generated in a way that produces the list ordered by priority without a separate ordering step.

A top item and new container are selected 1004. For example, the order manager 404 can select the first item in the priority list, which can have the highest priority if the list is sorted by priority. The order manager may also select an unused container data, unfull container data, or generate a new container data If the container is not full, a next item is selected 1008 and added to the container 1010. For example, the order manager 404 can step through the priority list in order of priority and select the next item that is within range of the original item selected. New items are selected 1008 and added to the container 1010 until the container is full 1006. If the end of the priority list is reached, the search can be expanded 1012. For example, using data from the grouping data system 412, the order manager 404 can increase the range in which items are selected.

Then, a new top item and new container are selected 1004. The process 1002 is repeated until all items are assigned, or all containers are full.

What is claimed is:

1. A method for operating components of a warehouse management system, the method comprising:

maintaining, by a warehouse management system comprising computer memory and one or more processors for an organization in which physical items are stored in physical container and in which physical container are stored in other physical containers, a database of data records identifying logical items and logical containers that correspond to the physical items and physical containers, the data records further reflecting the storage of physical items and physical containers with other physical containers by storing records for each logical item and logical container stored in a tree structure with leafs of the tree corresponding to the records for logical items and branches in the tree structure corresponding to logical containers recorded as containing the logical item;

identifying, by the warehouse management system, some of the items as high-priority items to be sent to a particular destination;

identifying, by the warehouse management system, containers to hold the high-priority items in transit;

identifying, by the warehouse management system, excess capacity in the containers that will be unused by the high-priority items when the high-priority items are moved to the containers;

identifying, by the warehouse management system, low-priority items to be sent to the particular destination based on the excess capacity;

aggregating, by the warehouse management system, the high-priority items and the low-priority items into a list of items-to-be-moved;

using, by the warehouse management system, the list of items-to-be-moved, generating a list of tasks comprising instructions to move the items-to-be-moved from their respective starting logical locations to the containers; and distributing, by the warehouse management system, the tasks to movers to cause the movers to move the items to the containers comprising:

grouping items-to-be-moved based on logical location by:

traversing the tree structure along leafs corresponding to identifiers of the items-to-be-moved and branches of the tree structure;

generating, from the traversals, a fully qualified location string for each item-to-be-moved comprising an ordered sequence of textual records such that each record in the ordered sequence corresponds to a level in the tree in order, beginning with a root textual record corresponding to the root of the tree and a leaf textual record corresponding to the leaf corresponding to the item-to-be-moved, wherein the ordered sequence of textual records are combined into the fully qualified location strings;

sorting the fully qualified location strings resulting in clustering of the items-to-be-moved by container in the sorted fully qualified location strings;

identifying movers based on logical location using clusters of the items-to-be-moved matching with logical locations of the identified movers;

assigning tasks to movers based on matches between logical location; and transmitting tasks assigned to movers' computing devices over a data network causing at least one of the group consisting of i) execution of automated instructions in tasks and ii) rendering a graphical user interface to a user with a graphical user interface.

2. The method of claim 1, wherein identifying some of the items as high-priority items to be sent to a particular destination further comprises receiving an order from a customer and wherein fulfillment of the order requires moving high-priority items to the particular destination.

3. The method of claim 2, the method further comprising at least one of a group comprising:

identifying as high-priority items, responsive to receiving the order from the customer, items below a target stock-level at the target logical location; and identifying as high-priority items, responsive to receiving the order from the customer, items not assigned to a customer and that are assigned to the target logical location within a particular time window.

4. The method of claim 1 further comprising generating a priority list of items and corresponding locations; and wherein all items-to-be-moved are within a range based on the corresponding locations.

5. The method of claim 1, wherein identifying low-priority items to be sent to the particular destination based on the excess capacity comprises:

generating an ordered list of items; and identifying items in the order of the list.

6. The method of claim 5, wherein the ordered list of items is ordered based on one or more factors, the factors including one of the group consisting of profit margin, freshness/date to spoilage, and cost to ship.

7. The method of claim 1, wherein distributing the tasks to movers to cause the movers to move the items to the containers comprises:

grouping items-to-be moved based on logical location;

identifying movers based on logical location; and assigning tasks to movers based on matches between logical location.

8. A system comprising:

a processor;

computer memory containing instructions that, when executed with the processor, cause the system to perform operations comprising:

maintaining, by a warehouse management system comprising computer memory and one or more processors for an organization in which physical items are stored in physical container and in which physical container are stored in other physical containers, a database of data records identifying logical items and logical containers that correspond to the physical items and physical containers, the data records further reflecting the storage of physical items and physical containers with other physical containers by storing records for each logical item and logical container stored in a tree structure with leafs of the tree corresponding to the records for logical items and branches in the tree structure corresponding to logical containers recorded as containing the logical item;

identifying, by the warehouse management system, some of the items as high-priority items to be sent to a particular destination;

identifying, by the warehouse management system, containers to hold the high-priority items in transit;

identifying, by the warehouse management system, excess capacity in the containers that will be unused by the high-priority items when the high-priority items are moved to the containers;

identifying, by the warehouse management system, low-priority items to be sent to the particular destination based on the excess capacity;

aggregating, by the warehouse management system, the high-priority items and the low-priority items into a list of items-to-be-moved;

using, by the warehouse management system, the list of items-to-be-moved, generating a list of tasks comprising instructions to move the items-to-be-moved from their respective starting logical locations to the containers; and distributing, by the warehouse management system, the tasks to movers to cause the movers to move the items to the containers comprising:

grouping items-to-be-moved based on logical location by:
traversing the tree structure along leafs corresponding to identifiers of the items-to-be-moved and branches of the tree structure;
generating, from the traversals, a fully qualified location string for each item-to-be-moved comprising an ordered sequence of textual records such that each record in the ordered sequence corresponds to a level in the tree in order, beginning with a root textual record corresponding to the root of the tree and a leaf textual record corresponding to the leaf corresponding to the item-to-be-moved, wherein the ordered sequence of textual records are combined into the fully qualified location strings;
sorting the fully qualified location strings resulting in clustering of the items-to-be-moved by container in the sorted fully qualified location strings;
identifying movers based on logical location using clusters of the items-to-be-moved matching with logical locations of the identified movers;
assigning tasks to movers based on matches between logical location; and
transmitting tasks assigned to movers' computing devices over a data network causing at least one of the group consisting of i) execution of automated instructions in tasks and ii) rendering a graphical user interface to a user with a graphical user interface.

9. The system of claim 8, wherein identifying some of the items as high-priority items to be sent to a particular destination further comprises receiving an order from a customer and wherein fulfillment of the order requires moving high-priority items to the particular destination.

10. The system of claim 9, the operations further comprising at least one of a group comprising:
identifying as high-priority items, responsive to receiving the order from the customer, items below a target stock-level at the target logical location; and
identifying as high-priority items, responsive to receiving the order from the customer, items not assigned to a customer and that are assigned to the target logical location within a particular time window.

11. The system of claim 9, the operations further comprising further comprising generating a priority list of items and corresponding locations; and
wherein all items-to-be-moved are within a range based on the corresponding locations.

12. The system of claim 8, wherein identifying low-priority items to be sent to the particular destination based on the excess capacity comprises:
generating an ordered list of items; and
identifying items in the order of the list.

13. The system of claim 12, wherein the ordered list of items is ordered based on one or more factors, the factors including one of the group consisting of profit margin, freshness/date to spoilage, and cost to ship.

14. The system of claim 8, wherein distributing the tasks to movers to cause the movers to move the items to the containers comprises:
grouping items-to-be moved based on logical location;
identifying movers based on logical location; and
assigning tasks to movers based on matches between logical location.

15. A non-transitory computer-readable medium containing instructions that, when executed with a processor, cause the performance of operations comprising:
maintaining, by a warehouse management system comprising computer memory and one or more processors for an organization in which physical items are stored in physical container and in which physical container are stored in other physical containers, a database of data records identifying logical items and logical containers that correspond to the physical items and physical containers, the data records further reflecting the storage of physical items and physical containers with other physical containers by storing records for each logical item and logical container stored in a tree structure with leafs of the tree corresponding to the records for logical items and branches in the tree structure corresponding to logical containers recorded as containing the logical item;

identifying, by the warehouse management system, some of the items as high-priority items to be sent to a particular destination;

identifying, by the warehouse management system, containers to hold the high-priority items in transit;

identifying, by the warehouse management system, excess capacity in the containers that will be unused by the high-priority items when the high-priority items are moved to the containers;

identifying, by the warehouse management system, low-priority items to be sent to the particular destination based on the excess capacity;

aggregating, by the warehouse management system, the high-priority items and the low-priority items into a list of items-to-be-moved;

using, by the warehouse management system, the list of items-to-be-moved, generating a list of tasks comprising instructions to move the items-to-be-moved from their respective starting logical locations to the containers; and distributing, by the warehouse management system, the tasks to movers to cause the movers to move the items to the containers comprising:

grouping items-to-be-moved based on logical location by:

traversing the tree structure along leafs corresponding to identifiers of the items-to-be-moved and branches of the tree structure;

generating, from the traversals, a fully qualified location string for each item-to-be-moved comprising an ordered sequence of textual records such that each record in the ordered sequence corresponds to a level in the tree in order, beginning with a root textual record corresponding to the root of the tree and a leaf textual record corresponding to the leaf corresponding to the item-to-be-moved, wherein the ordered sequence of textual records are combined into the fully qualified location strings;

sorting the fully qualified location strings resulting in clustering of the items-to-be-moved by container in the sorted fully qualified location strings;

identifying movers based on logical location using clusters of the items-to-be-moved matching with logical locations of the identified movers;

assigning tasks to movers based on matches between logical location; and transmitting tasks assigned to movers' computing devices over a data network causing at least one of the group consisting of i) execution of automated instructions in tasks and ii) rendering a graphical user interface to a user with a graphical user interface.

16. The medium of claim 15, wherein identifying some of the items as high-priority items to be sent to a particular destination further comprises receiving an order from a customer and wherein fulfillment of the order requires moving high-priority items to the particular destination.

17. The medium of claim 16, the operations further comprising at least one of a group comprising:

identifying as high-priority items, responsive to receiving the order from the customer, items below a target stock-level at the target logical location; and identifying as high-priority items, responsive to receiving the order from the customer, items not assigned to a customer and that are assigned to the target logical location within a particular time window.

18. The medium of claim 16, the operations further comprising further comprising generating a priority list of items and corresponding locations; and wherein all items-to-be-moved are within a range based on the corresponding locations.

19. The medium of claim 15, wherein identifying low-priority items to be sent to the particular destination based on the excess capacity comprises:

generating an ordered list of items; and identifying items in the order of the list.

20. The medium of claim 19, wherein the ordered list of items is ordered based on one or more factors, the factors including one of the group consisting of profit margin, freshness/date to spoilage, and cost to ship.

* * * * *